(12) United States Patent
Bennett

(10) Patent No.: US 11,804,650 B2
(45) Date of Patent: Oct. 31, 2023

(54) METHODS AND SYSTEMS USING NETWORKED PHASED-ARRAY ANTENNAE APPLICATIONS TO DETECT AND/OR MONITOR MOVING OBJECTS

(71) Applicant: Andrew Bennett, Belmont, MA (US)

(72) Inventor: Andrew Bennett, Belmont, MA (US)

(*) Notice: Subject to any disclaimer, the term of this patent is extended or adjusted under 35 U.S.C. 154(b) by 761 days.

(21) Appl. No.: 16/945,856

(22) Filed: Aug. 1, 2020

(65) Prior Publication Data
US 2020/0365981 A1 Nov. 19, 2020

Related U.S. Application Data

(62) Division of application No. 15/436,982, filed on Feb. 20, 2017, now Pat. No. 10,804,601.

(51) Int. Cl.
*H01Q 1/42* (2006.01)
*G01S 13/72* (2006.01)
(Continued)

(52) U.S. Cl.
CPC .............. *H01Q 1/42* (2013.01); *B64C 1/36* (2013.01); *B64C 39/024* (2013.01); *B64D 47/08* (2013.01); *B64F 1/362* (2013.01); *G01S 7/003* (2013.01); *G01S 13/66* (2013.01); *G01S 13/726* (2013.01); *G01S 13/86* (2013.01); *G01S 13/87* (2013.01);
(Continued)

(58) Field of Classification Search
CPC ........ G01S 7/003; G01S 13/87; G01S 13/003; G01S 13/86; G01S 13/878; G01S 13/426; G01S 13/726; G01S 13/524; G01S 13/5242; G01S 13/88; G01S 13/58; G01S 13/72; G01S 13/765; G01S 13/9029; G01S 13/92; G01S 15/88; G01S 17/08; G01S 17/933; G01S 2013/0245; G01S 5/0284; G01S 5/14; G01S 13/66; G01S 2013/0254; H01Q 1/42; H01Q 1/005; H01Q 1/28; H01Q 1/3233; H01Q 1/34; H01Q 3/34; H01Q 21/22; B64C 1/36; B64C 39/024; B64D 47/08; B64F 1/362; G05D 1/0011; B64U 2101/00; B64U 2201/20; Y02A 90/10
See application file for complete search history.

(56) References Cited

U.S. PATENT DOCUMENTS

| | | | | |
|---|---|---|---|---|
| 2017/0031013 A1* | 2/2017 | Halbert | ................... | G01S 7/414 |
| 2017/0297712 A1* | 10/2017 | Kim | ...................... | B64C 39/024 |
| 2018/0074161 A1* | 3/2018 | Rosenbaum | ............ | G01S 7/415 |

OTHER PUBLICATIONS

M. Nayak, J. Beck and B. Udrea, "Real-time attitude commanding to detect coverage gaps and generate high resolution point clouds for RSO shape characterization with a laser rangefinder," 2013 IEEE Aerospace Conference, Big Sky, MT, USA, 2013, pp. 1-14, doi: 10.1109/AERO.2013.6496861. (Year: 2013).*

* cited by examiner

*Primary Examiner* — Jelani A Smith
*Assistant Examiner* — Paul A Castro
(74) *Attorney, Agent, or Firm* — Willard Alonzo Stanback PC

(57) ABSTRACT

Disclosed is a networked array of radar enclosures that can be arranged to cover a desired geographical location. The array can detect moving objects in the coverage area. When warranted, elements of the array can also control the movement of associated objects, for example, friendly drones. The present invention also combines attributes that facilitate the less conspicuous detection and monitoring of moving objects, with the capability of distinguishing types of moving objects.

11 Claims, 13 Drawing Sheets

(51) Int. Cl.
*G01S 13/86* (2006.01)
*G01S 13/87* (2006.01)
*G01S 7/00* (2006.01)
*B64C 1/36* (2006.01)
*B64C 39/02* (2023.01)
*B64D 47/08* (2006.01)
*B64F 1/36* (2017.01)
*G01S 13/66* (2006.01)
*G01S 13/88* (2006.01)
*G05D 1/00* (2006.01)
*G01S 13/42* (2006.01)
*G01S 13/02* (2006.01)
*B64U 101/00* (2023.01)
*H01Q 1/00* (2006.01)
*H01Q 1/28* (2006.01)
*H01Q 1/32* (2006.01)
*H01Q 1/34* (2006.01)
*H01Q 3/34* (2006.01)
*H01Q 21/22* (2006.01)

(52) U.S. Cl.
CPC .......... *G01S 13/878* (2013.01); *G01S 13/88* (2013.01); *G05D 1/0011* (2013.01); *B64U 2101/00* (2023.01); *B64U 2201/20* (2023.01); *G01S 13/426* (2013.01); *G01S 2013/0245* (2013.01); *G01S 2013/0254* (2013.01); *H01Q 1/005* (2013.01); *H01Q 1/28* (2013.01); *H01Q 1/3233* (2013.01); *H01Q 1/34* (2013.01); *H01Q 3/34* (2013.01); *H01Q 21/22* (2013.01)

METHODS AND SYSTEMS USING NETWORKED PHASED-ARRAY ANTENNAE APPLICATIONS TO DETECT AND/OR MONITOR MOVING OBJECTS

BACKGROUND

These teachings relate generally to methods and systems using phased-array antennae applications, preferably networked together, to detect and/or monitor moving objects.

The vast majority of weather radar systems are covered by a radome. This is essential to protect expensive radar components from the impact of severe weather such as hail. It also reduces the wear of pedestal subsystem by isolating it from the strong winds. The effect of an attenuation induced by a film water, rivulets and droplets present on a radome scales up with frequency and is especially disadvantageous in communication systems operating in 20 GHz band.

There is a need for a radar enclosure that mitigates the attenuation due to rain and snow in present radar enclosures. This need is evidenced in the deployment of radar in the detection and monitoring of moving objects. In many situations, persons that are interested in detecting and monitoring moving objects, such as, for example, drones, seek to use systems and system elements that are as inconspicuous as possible. Oftentimes, small is good, but small often also correlates to less coverage area of the radar—both in breadth and in altitude. Thus, there is also a need to be able to increase the range of radar coverage and the collection of data to thereby increase the volume and accuracy of the readings and the scope of detection and monitoring. Also, it is often desirable to be able to distinguish one type of moving object from another. For instance, it may be important distinguish a bird from an unassociated drone.

BRIEF SUMMARY

The present invention combines attributes that facilitate the less conspicuous detection and monitoring of moving objects. One aspect of a preferred embodiment of the present invention is a radar enclosure that mitigates attenuation due to rain and snow. Another aspect of a preferred embodiment is the networking of the radar elements with such enclosures to increase the radar coverage by adding to the possible collection of locations and thus potentially increasing the data to be analyzed—ultimately increasing the volume and accuracy of the readings. A third aspect of a preferred embodiment is an identification component that is capable of distinguishing types of moving objects.

SUMMARY OF THE INVENTION

The inventive aspects of the radar element are discussed in general in patent application Ser. No. 15/172,082 (the "Radar Unit Application"). The radar elements disclosed and taught in the Radar Unit Application including an enclosure with two side wall components, a top aerodynamically streamlined shape component, the two side wall components extending from the base surface to the a top aerodynamically streamlined shape component forming an enclosure cavity, and an antenna supporting component disposed in the enclosure cavity and configured to support a phased array antenna, the phased array antenna being disposed at an angle with respect to a normal to the base surface. In one embodiment of such a radar element, the angle with respect to the base surface is between 45° and about 90° and preferable the radar enclosure also includes a flow redirecting component disposed in the enclosure cavity and configured to redirect flow out of the enclosure cavity and away from the antenna supporting component.

A continuation in part application (Ser. No. 15/382,644) related to the Radar Unit Application (the "Networked Units Application"), teaches, among other things, the connecting of the radar elements—with the inventive elements (as summarized in the Radar Unit Application), where the resulting radar element system can provide coordinated detection in real or near real time. In one embodiment, the inventive system can exploit the features of existing high-resolution wide band radar technology (e.g. automotive radar elements) to create, for example, an array of detectors that are less tasked in their individual operations and thus, as a system, are more efficient and effective in collecting data. This array can be manually or automatically assembled. Because each radar element can be small and self-contained, each can be mounted on a roof of a vehicle, or secured in a fixed geographical location, such as, for example, on a building roof, on a pole, or anywhere from where the radar element can have an unobstructed view (e.g., when collecting overhead data, a "view of the sky").

The present invention incorporates the elements taught in the Radar Unit Application and in the Networked Units Application with, among other things, communications and identification elements.

A number of other embodiments are disclosed hereinbelow.

For a better understanding of the present teachings, together with other and further needs thereof, reference is made to the accompanying drawings and detailed description.

DETAILED DESCRIPTION

The following detailed description presents the currently contemplated modes of carrying out the invention. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context dearly dictates otherwise.

Except where otherwise indicated, all numbers expressing quantities of ingredients, reaction conditions, and so forth used in the specification and claims are to be understood as being modified in all instances by the term "about."

"Aerodynamically streamlined component" as used herein, refers to a component design or configuration in which the difference in fluid pressure against a leading edge of the component and the fluid pressure against the trailing edge of the component is reduced, resulting in reduced pressure drag.

Inventive Radar elements

Figure 1:
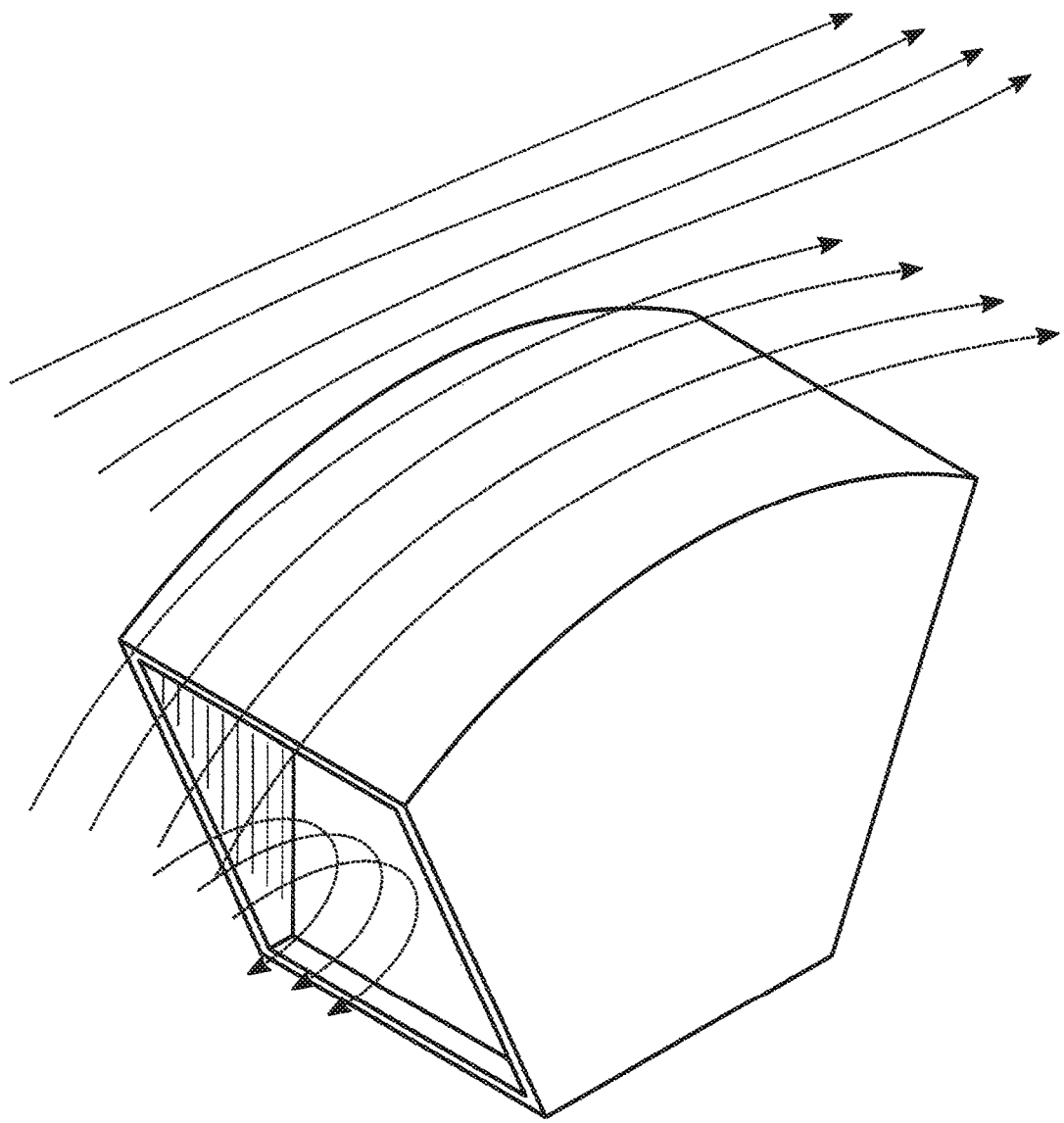
FIG. 1 shows an embodiment of the radar enclosure of these teachings in which the antenna panel can be additionally protected with a "roof overhead"

As discussed in detail in the Radar Unit Application and, for example, as seen in FIG. 1, in one or more instances, the radar enclosure of these teachings includes two-side wall components, a top aerodynamically streamlined shape component, the two side wall components extending from the base surface to the a top aerodynamically streamlined shape component forming an enclosure cavity, and an antenna supporting component disposed in the enclosure cavity and configured to support a phased array antenna, the phased array antenna being disposed at an angle with respect to a normal to the base surface. In one instance, the angle with respect to the base surface is between 45° and about 90°. In another instance, the radar enclosure of these teachings also includes a flow-redirecting component disposed in the enclosure cavity and configured to redirect flow out of the enclosure cavity and away from the antenna-supporting component.

The method taught in the Radar Unit Application includes installing a phased array antenna in a radar enclosure, where the radar enclosure includes two side wall components, a top aerodynamically streamlined shape component, the two side wall components extending from the base surface to the a top aerodynamically streamlined shape component forming an enclosure cavity, and an antenna supporting component disposed in the enclosure cavity and configured to support a phased array antenna, the phased array antenna being disposed at an angle with respect to a normal to the base surface. A radar enclosure features a streamlined shape in order to reduce aerodynamic drag. A phased-array antenna panel is located in a radar enclosure cavity. A phased-array antenna can be additionally protected against rain with a roof overhang located in the upper part of a radar enclosure cavity as shown in FIG. 1. One of ordinary skill in the art would realize that a phased-array antenna could also be tilted down and scan electronically upward.

Networked Radar elements

Figure 2:
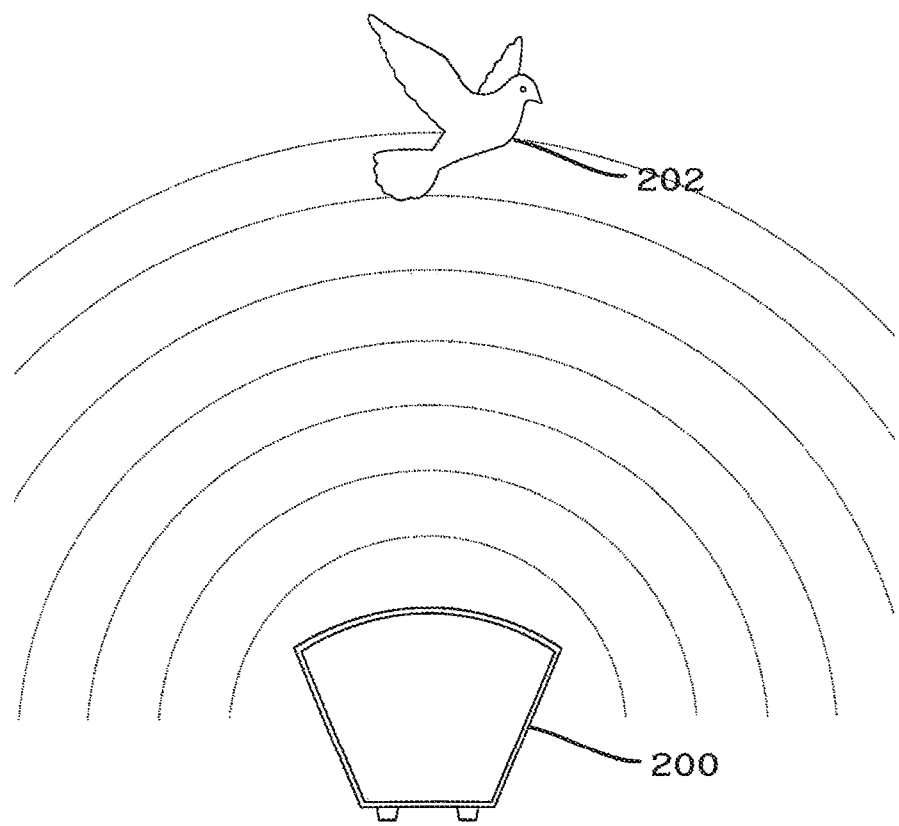
FIG. 2 shows a radar element and its air bound coverage areas.

As discussed in more detail in the Networked Units Application and as shown in FIG. 2, radar element 200 can provide close-range detection of distal moving objects (like object 202—e.g., a low flying bird) in real or near real time. The system, made primarily of the radar elements, exploits the features of high-resolution wide band radar technology (e.g. automotive radar elements) to function as a stand-alone detection station or, when preferred, as part of an array of detectors. As part of an array, the radar elements of the system can be manually or automatically assembled, meaning that the user can activate the different radar elements in the user's discretion or the system can be programmed to activate specific radar elements as certain conditions are met. When the radar element is self-contained, weatherproof, and small, it can be mounted on a car roof, building roof, on a pole or anywhere that has a view of the sky. The inventive system may also include one or more operator control units (OCUs), which could be used to display the radar coverage over a map of the local area. The OCUs could also be part of a main control computer through which the system user could transmit and receive information and data in exchanges with the radar element(s). These possible transmissions may be conducted through various means that are known to those of ordinary skill in the art (e.g., through the use of radio signal technology, other wireless equipment, wired components and more/alternatives). Where multiple radar elements are electronically connected, via the main control computer, to each other, the perceptive strength of a resulting array of radar elements is more powerful than each individual radar element alone.

Figure 3:
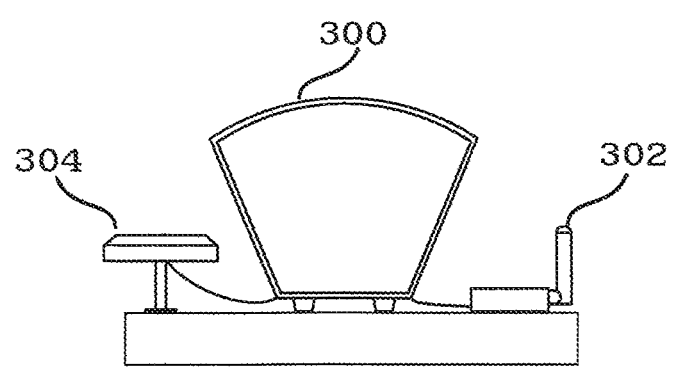
FIG. 3 shows a radar element with GPS and communications components.

In reference to FIG. 3, one embodiment of the present inventive system includes at least one radar element 300 (electronically and/or mechanically steered), a communications capability 302 (radio, wire or fiber according to the local needs and conditions), and an optional geolocation capability 304 (e.g. GPS) or it can be pre-programmed with a location when it is installed. An applicable radar element 300 could be powered by a vehicle it is attached to, by batteries, solar panels or by wiring it into the local power grid. In a particular preferred embodiment, radar element(s) could have the ability to communicate wirelessly with the transmission enabled moving objects and with one or more human operators/users situated in one or more locations that are distal from the location of radar element(s).

Figure 4:
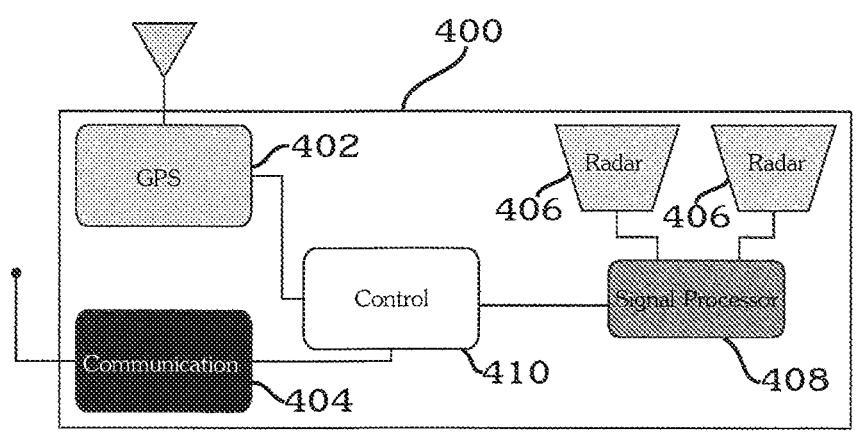
FIG. 4 shows the components of a radar element.

FIG. 4 shows a block diagram of radar element 400 that is configured for use in a networked system. The diagram includes a GPS component 402 through which the location of radar element 400 can be detected and monitored. The communications component 404 enables the communication of radar element 400 with other devices, systems and networks. The radar components 406, two in this particular embodiment (more or less than two as warranted), are the components that cause the device possess radar functionality. The signal processor 408 is the component that interprets and analyzes feeds from the radar components 406, with such processing being managed and supported by the control element 410. The control element 410 also manages and supports the operation of the other components of the radar element.

Figure 5:
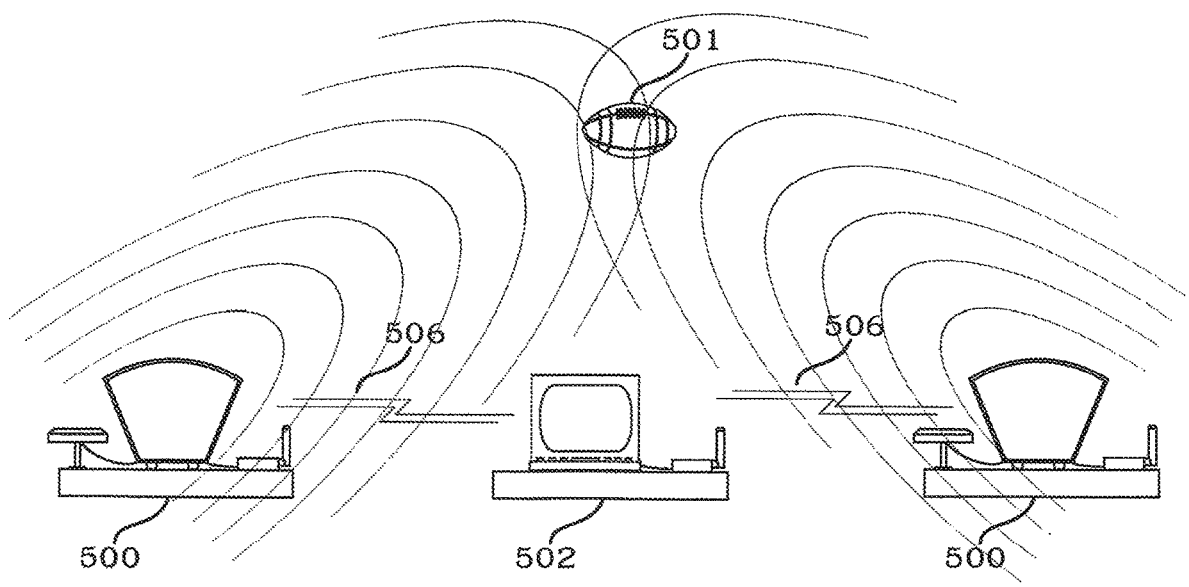
FIG. 5 shows two radar elements resting on the ground with a main computer positioned between the elements and an air borne object being monitored by the radar elements.

FIG. 5 shows a network with individual radar elements 500 capable of coordinated detection out to several hundred or even thousands of meters, depending on emitted power levels and type of target. Such detection could be in real or near real time. Multiple radar elements can be networked together to provide continuous, overlapping coverage of a line or area of interest. Further individual radar elements 500, whether or not they are networked, are equipped with communications and location information capabilities (e.g. built in GPS or manually surveyed into position) and can be commanded to self-assemble into an array or extend or further empower an already installed array. By doing this operation, networked radar elements 500 can cooperatively share information about detected and/or monitored associated and unassociated moving objects, which allows them to, for example, (A) detect and monitor the location of airborne objects, (B) provide information for the creation of anticipated trajectories of the airborne objects (like, e.g., object 501—in this case a football) as they move, (C) inform other radar elements 500 of impending contacts, (D) put multiple radar elements 500 on the same airborne objects to get more accurate information about that airborne object (position, speed, size, etc.) and (D) perform a combination of the foregoing tasks. The inventive system is also capable of highlighting gaps in coverage and informing the operator of the need to reposition radar elements 500, add more radar elements 500, or take some other actions. Accordingly, the information transmitted between radar elements 500 and main control computer 502 may be capable of controlling operational attributes of and detection by such radar elements 500. Also, given the possible means for transmitting information between radar elements 500, radar elements 500 do not have to be in close proximity for the system to work effectively and efficiently.

In one preferred embodiment of the present invention, radar elements 500, when deployed at a distance from the points of origin of object 501, are capable of communicating with the human operator/user at the points of origin or at different locations. Also, if the operation is more automated, radar element 500 could communicate with the programmed equipment at such points of origin or at different locations. Main control computer 502 at a remote location, which may comprise software that includes operational objectives and a user interface, could be run on any computer that has networking and/or satellite communications access. Preferably, main control computer 502 also includes software and/or other means that enable main control computer 502 to establish the total coverage area of radar elements 500 and the gaps in such coverage from information shared by such radar elements. The respective coverage areas of radar elements 500 and the position and trajectory of a moving object in the coverage areas can then be displayed on a screen electronically connected to main control computer 502. The inventive radar elements 500 have the advantages of (A) reach—the multiplicity of deployments of radar elements 500 can cover larger areas as desired, (B) timing—the activation of radar elements 500 at differing times, and (C) mobility—the smaller sizes of radar elements 500 facilitating their deployment almost anywhere.

In particular, FIG. 5 shows multiple deployments of present inventive radar elements 500 and a depiction of main control computer 502. In one preferred embodiment, one or more radar elements 500 can be in communication with main control computer 502 through the transmission of information via signals 506 between one or more radar elements 500 and main control computer 502. In such a configuration, the operator/user could operate functions of applicable radar elements 500. The human operators/users and/or the equipment at main control computer 502 could coordinate some or all of the activities of radar elements 500. If networked, the main control computer could communicate and coordinate the activities of more than one radar elements 500, while also receiving and/or sending signals to moving objects 501 (when object 501 includes the applicable technology). Such main control computer 502 could accomplish this coordination with transmission enabled associated moving objects 501, for example, through signals 506 transmitted first to one or more radar elements 500 locations. Amongst the components of the networked elements, the main control computer could be tasked with high level planning and administration of human operator/user authorizations.

In a further embodiment, main control computer 502 could be enabled to detect and/or monitor object 501. In FIG. 5, object 501 is a regulation football, but one of ordinary skill in the art would realize that object 501 could be one of a variety of unassociated moving objects. Further, one with ordinary skill in the art would realize that object 501 could include (A) transmission elements that enhance the ability of main control computer 502, through its communication with radar elements 500, to detect and/or monitor such unassociated moving object 501, (B) receiving elements that enable unassociated moving object 501 to receive signals from main control computer 502, or (C) one or more elements that enable transmission and receiving. In still a further embodiment, one or more radar elements 500 could also (with main control computer 502), or could instead (of main control computer 502), be in communication with, for example, transmission/receiving enabled moving objects. In certain embodiments, the transmission of information and other communication could be accomplished through over-the-air (e.g., wireless) communications, such as, for example, through radio signals, cellular technologies or other means, now known or to be known. Using such technologies within one or more radar elements 500 (e.g., communications technology, processing systems and means of automatically determining its geographical location), that can be either manually programmed and/or automatically adjusted. With the foregoing, the system can be better equipped to be more accurate and precise in its readings and measurements.

The human operator/user could, for example, through the use of main control computer 502, program radar element 500 via the user interface. He/she could program detection assignments, monitor transmission enabled associated moving objects in communication with radar elements 500, set global parameters, choose specific targets, and check the health of radar elements 500 or any element thereof. Such human operators/users could also, for example, select specific radar elements 500 locations or transmission enabled associated moving objects and monitor them closely. In addition to high-level mission parameters, the human operators/users could select specific transmission enabled associated moving objects 501 or radar elements 500 for direct access to data where radar elements 500 require human intervention (e.g. the human is required to select or approve a target). Thus, main control computer could be used to monitor, relative to the total coverage area, moving objects detected by radar elements.

The inventive system includes a means for transmitting information between two or more radar elements 500. In a further enhanced version of the inventive system transmission is exchanged between one or more radar elements 500 and transmission enabled associated moving objects 501. In addition to the transmission of information between radar elements 500 and transmission enabled associated moving objects 501, there is also, in another embodiment of the inventive system, a means for transmitting information between the radar elements 500 and a main control computer 502, which may be a notable distance from the radar elements 500.

Figure 6:
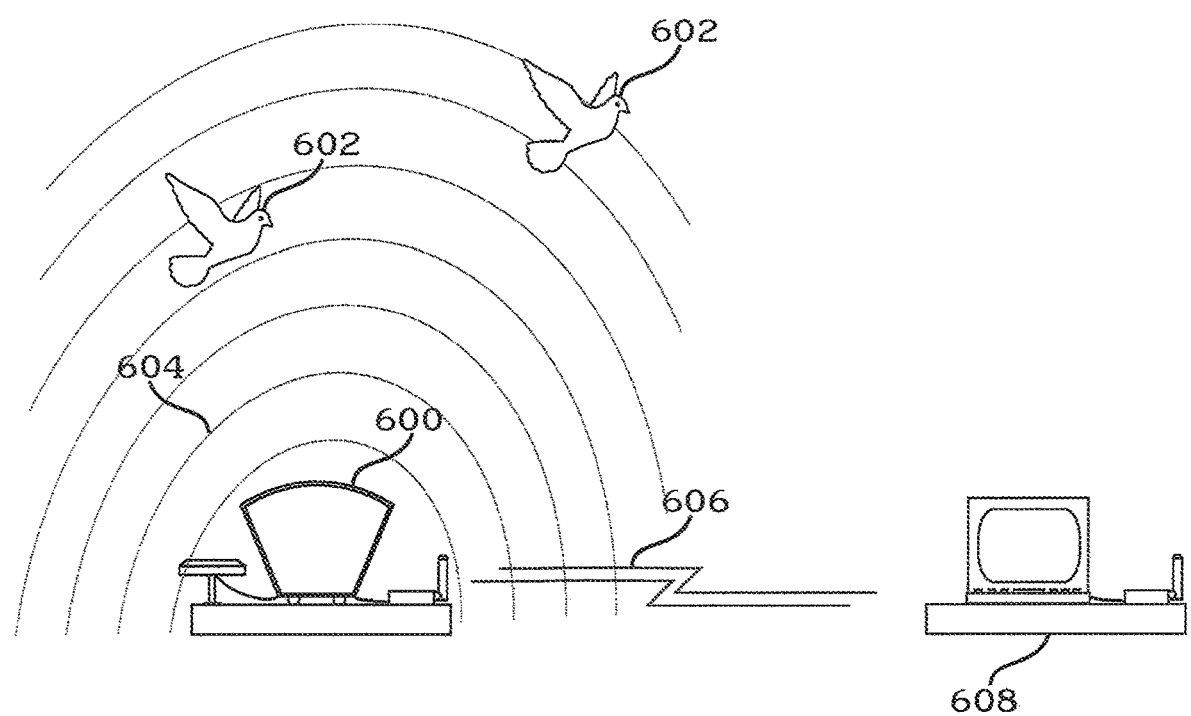
FIG. 6 shows a radar element, a set of airborne objects being detected and monitored by the radar element, and a command center where signals are transmitted to and from the radar element.

FIG. 6 shows an example of how a multitude of unassociated moving objects 602 could be detected and monitored with a single radar element 600. Signal 604 transmits from radar element 600 to moving objects 602. In such a configuration, an operator/user could coordinate the detection and monitoring of moving objects 602 relative a specific location. Further, radar element 600 could be in communications with main control computer 608 through signal 606. Such ability to communicate could allow an operator/user to thus, through this particular embodiment of the invention, coordinate the detection and monitoring of moving objects 602 from a location remote from radar element 600 and, if and as necessary, to also remotely manage the activities of radar element 600. Another element a particular embodiment of the present invention is a means for transmitting information between, for example, radar element 600 and main control computer 608 to monitor travel by moving objects 602 in relation to radar element 600. Such information could include, for example, data regarding the flight time of, destination of, information and sample gathered by, and other operations of one or more moving objects 602. Main control computer 608, attached to radar element 600, provides a means for monitoring, for example, environmental conditions and other local circumstances in the geographical proximity of such radar element(s).

One of ordinary skill in the art would realize that the present invention could also be used to detect and monitor moving objects that are not air bound. For examples, the present invention could be used in roadside monitoring activities. As part of such a deployment, one or more radar elements could be set up along roads or highways such that the coverage of the radar elements includes, for example, the area along the sides of the road or highway, the surface of such road or highway, or a combination of areas and surfaces. When an object approaches the area covered by the radar element, such as a deer, coyote, moose, people or other moving or movable objects, the system of the present invention could, for example, detect and monitor the approach, log the time and location of the engagement, and then transmit information about the situation to a detecting device or system (e.g., a receiver of an oncoming vehicle or a stationary monitoring system). The receiver in an oncoming vehicle could be part of or connected with, for example, (A) a mobile phone application that would, in essence, be managed by someone in the approaching vehicle or (B) the vehicle itself, if properly equipped with the necessary technology. Additional and more specific users of the present invention deployed roadside could be emergency responders or autonomous operated vehicles. With the detection and monitoring of the circumstances of the area covered by the present invention system, the system can thus, for example, warn oncoming vehicles (with or without drivers) about the possibility of an animal entering the road or being on the road before such vehicles (or their drivers) might otherwise detect the animal, thereby improving safety. Further, the same system, or a derivative of it, could be used to inform emergency responders of vehicles that are stationary on the side of the road or highway—an indication that assistance may be needed.

Another area in which the present invention could be useful in connection with moving objects that are not air bound is on or near railroad tracks. With such an embodiment of the present invention, the radar elements could be, for example, set up along railroads and/or in the vicinity of railroad crossings to detect obstacles on or crossing the tracks. The system could then warn oncoming trains and/or train traffic controllers of moving objects on the tracks that might be hazardous. In the reverse scenario, the same radar elements could monitor the arrival time and speed of passing trains and report such information to the train system controllers, thereby alerting the controllers with accurate information about train speeds and locations. Such detection could be made with respect to trains traveling too fast/slow or in unexpected locations.

When the present invention is deployed in a system located near or in an airport or other secure facility, the system could be configured to monitor airborne objects, objects on the ground, or combinations of the foregoing. For example, it could be used to monitor and track objects including, for example, local birds that might pose a hazard to inbound or outbound flights. Operationally, such a system could warn the airport that geese flocks are in the takeoff path. The same system, or a derivative of it, could be positioned to monitor fences and property lines. In that way, the system could detect and report any attempt to access the property, such as airfields, equipment storage yards, military installations, etc.

Using the present invention in a smaller or more discrete environment, the system could be used to monitor airborne unassociated moving objects such as footballs (as suggested above), golf balls, tennis balls, etc. Such an embodiment could supply monitoring data to other systems or devices, such as, for example, tracking cameras (that could follow the ball). It could work in conjunction with or incorporate technology to highlight the target object for display on screens and monitors.

Still another embodiment of the invention could be used in water environments. In this case, the present inventive system could be installed along waterfronts, harbors, rivers or other bodies of water to monitor, for example, shipping traffic. The radar elements could be, in specific instances, placed on buoys/fixed installations at sea to monitor the local area for unauthorized ship traffic (e.g. illegal goods/people smuggling). One of ordinary skill in the art would also realize that one or more the radar elements could be mounted on moving vessels—in addition to or instead of mounting such radar elements on land (fixed). Such vessels could possibly be controlled manually or automatically, further and for example, possibly controlled automatically through the use of the present invention (with the communication of signals from a main control computer to control placement of the vessels, with the main control computer using data connected by the radar elements of the present invention).

With regards to the inventive process, the present invention is a method of communicating with one or more transmission enabled associated moving objects. This process includes the step of transmitting a signal between a remote location and a distal location, such as, for example, a main control computer. The process also includes transmitting a signal between such radar element's location and transmission enabled associated moving objects. The foregoing may enable the positioning of such transmission enabled associated moving objects—if and to the extent their position can be controlled remotely—in close proximity with the radar element's location.

Figure 7:
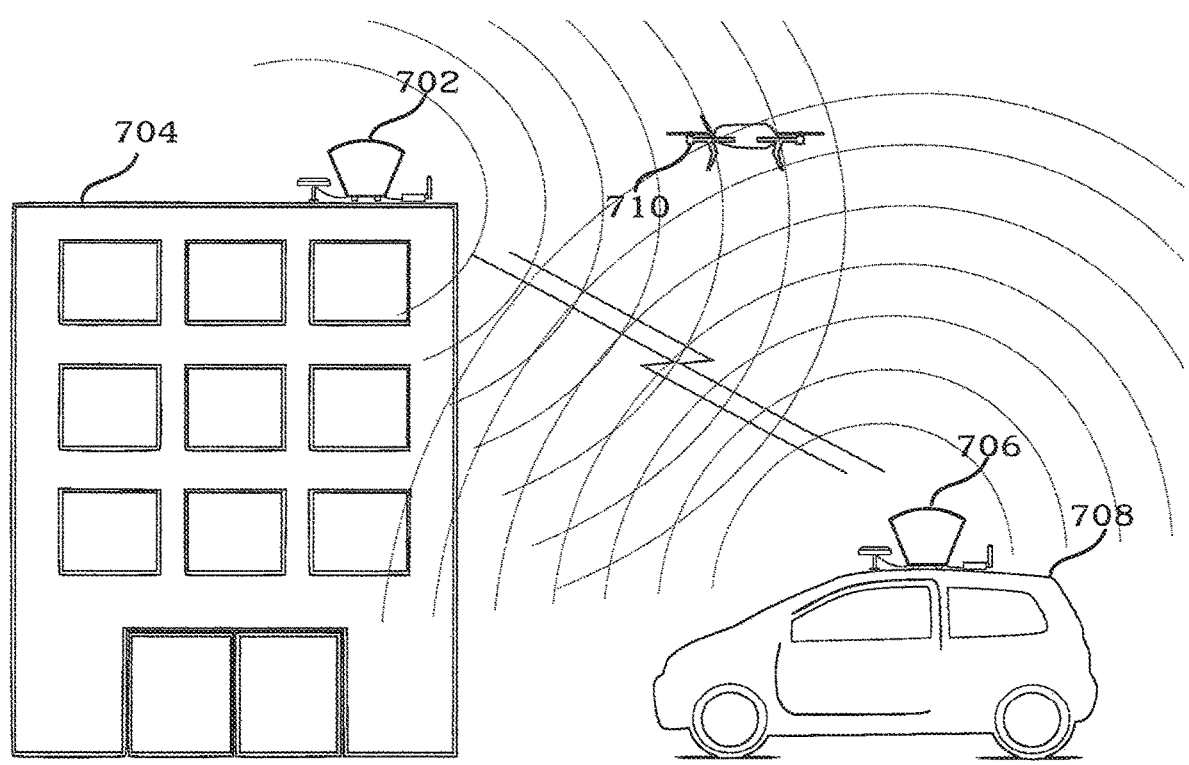
FIG. 7 shows a set of radar elements, one on a vehicle and other on a building.

FIG. 7 shows the deployment of two radar elements. Radar element 702 is mounted on building 704 and radar element 706 is mounted on the top of vehicle 708. One of ordinary skill in the art would also realize that radar 706 could also be mounted on other associated moving objects such as, for example, moving ships (manned or unmanned), aircraft (manned or unmanned) and other associated moving objects to collectively, where applicable, create a dynamic (modifiable in the placement of its components) system for detection and monitoring. Both radar element 702 and radar element 706 are positioned to detect and monitor the travel of drone 710 as it passes through each radar element's coverage area. As suggested by the mounting of radar element 706 on vehicle 708, the coverage area of radar element 706 can be varied to a larger extent than the coverage area of radar element 702—affixed to a specific location of building 704. One of ordinary skill in the art would recognize that the attachment of radar element 702 to building 704 could be made at various locations within or on building 704, but the range is of course limited by the location and dimensions of building 704. While its possible for vehicle 708 could be stationary while drone 710 is airborne, there may be occasions in which both vehicle 708 (with radar element 706) and drone 710 are in motion. In addition, the readings of radar element 702, as electronically connected to and through a network that is also connected to the positioning controls of vehicle 708, could be used, for example, to position vehicle 708 upon which radar 702 is mounted vis-a-vie other networked radar elements to ensure that the networked array of radar elements cover the desired area (e.g., minimizing or eliminating gaps in coverage). The gap could be recognized through the aggregated data gathered through the use of the radar array and the positioning of the applicable vehicle(s) 708 could be accomplished manually or through automation.

One of ordinary skill in the art would also recognize that the radar elements, in part due to their preferred smaller size, could be part of an embodiment of the present invention that is portable—with no more permanently fixed location of any radar element. For example, the operable elements of the system could be sized and configurable for portable deployment to cover a multitude of desirable areas. In a specific example, present inventive system could be deployed to cover drone activity in specific areas and then readily disassemble to be transported to other locations. In the specific case of drone detection, certain embodiments of the inventive system could provide close-range detection of airborne vehicles in real or near real time. These capabilities are fostered by the use of high-resolution wide band radar technology, liked those possessed by the radar elements described herein, as a stand-alone detection station or as part of an array of detectors. This array can be manually or automatically assembled.

One of ordinary skill in the art would also appreciate that a self-contained, small radar element (as described herein) can be mounted on a car roof or building roof (as shown in FIG. 7), or alternatively on a pole or anywhere that has a view of the sky or above ground area. Also, various applications and deployments of particular embodiments of the present invention might include monitoring of, for example, local prison airspace, high value building perimeters (e.g. the White House or Capitol building), temporary high-value location perimeters (e.g. Super Bowl, political rally), airport perimeters, or any other location where drones or other airborne objects may need to be detected and monitored.

Figure 8:
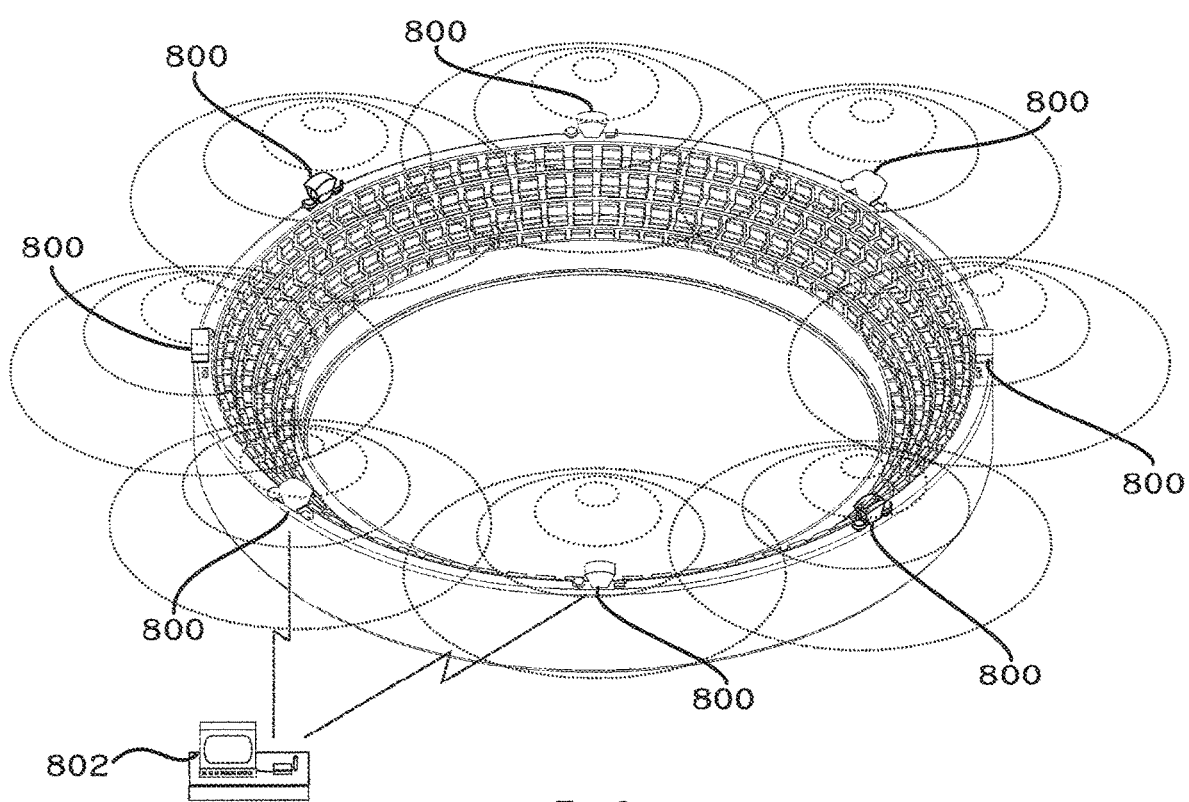
FIG. 8 shows the placement of eight radar elements, each of which can be positioned separately, and all of which are electronically connectable with a main control computer.

FIG. 8 shows the placement of eight radar elements 800, each separately located, each in electronic communication with the radar element 800 closest to it, and all electronically connectable with a main control computer 802. Such a configuration of the present invention enables the monitoring of a specified area of airspace and surrounding area defined by the coverage area of the radar elements, the number of radar elements, and their positioning. One skilled in the art would realize that the inventive radar elements described herein are an example of small dimensioned radar elements that could be used in the arrayed configuration wherein the radar elements can be less conspicuous. A notable application of such an array of less conspicuous radar elements for moving detection and monitoring would be, for example, stadiums (where the users of the stadiums are monitoring for unassociated drones and other unassociated moving objects), and plants and other facilities (where security is an important characteristics). In the embodiment of the present invention shown in FIG. 8, the individual radar elements 800 are capable of detection out to 200-300 meters and radar elements 800 as a group can be networked together to provide continuous, overlapping coverage over the area of interest (e.g., a stadium). If the radar elements are also equipped with communications and location detection (e.g. GPS) technology, they can be programmed to self-assemble and direct into an array and automatically coordinate their individual coverage areas to provide the maximum total coverage for the larger desired area.

Figure 9:
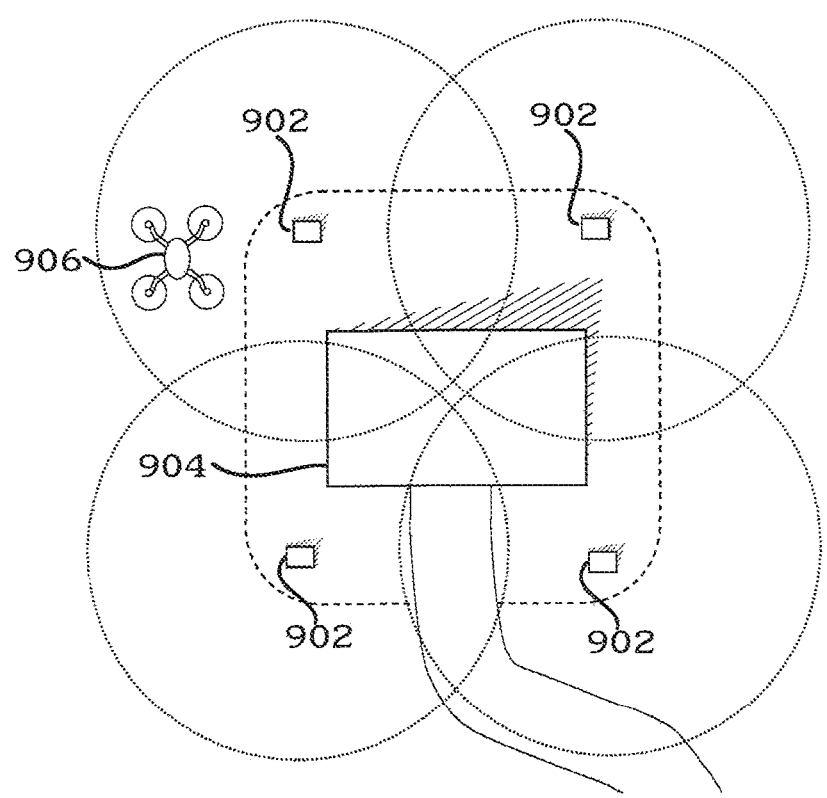
FIG. 9 shows a set of radar elements that are positioned to detect and monitor the location of unassociated drones.

FIG. 9 shows a set of radar elements that are positioned to detect and monitor the location of associated and unassociated drones. This example of an embodiment of the present invention includes a series of radar elements 902 positioned strategically in proximity to location 904 with airspace that needs to be monitored. In this depiction, location 904 is a processing plant that incorporates trade secret operations that can be visible from the air through the use of spy drone 906. The radar elements 902 monitor the airspace watching for airborne objects like, for example, spy drone 906, and notify the security personnel when airborne objects that may be spy drone 906 are in the range of the detection of radar elements 902. In a particular embodiment of the present invention, the inventive system can notify the security forces with the current location, altitude and travel path of spy drone 906, thereby allowing the security forces to stop the trade secret process, conceal the components of trade secret equipment or take such other action needed to protect the viewing of the trade secret via spy drone 906 while spy drone 906 is present or in the vicinity. The system could also monitor and then cause the interception of spy drone 906, as and when appropriate, using kinetic, electromagnetic or other blinding or disabling technologies.

Figure 10:
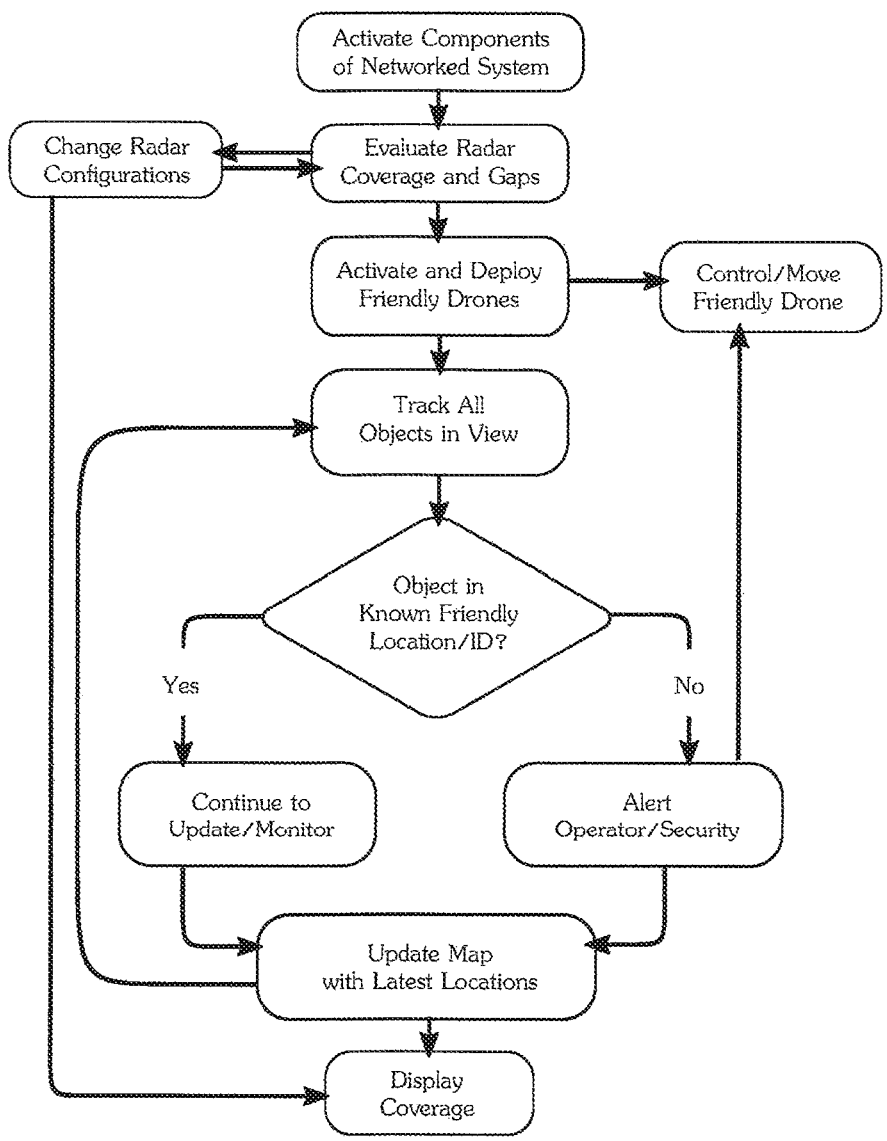
FIG. 10 shows a schematic of the process through which the present invention detects and monitors unassociated airborne objects and manages the operation of associated drones.

FIG. 10 shows schematic of the operation of the present invention in detecting and monitoring unassociated drones and managing the operation of associated drones. In this particular example of an embodiment, the system includes networked radar elements, two associated (friendly) drones, a main control computer in communication with such radar elements (with the computer and the radar elements exchanging data) and such associated drones (also exchanging data with the main control computer), GPS functionality attached to the radar elements housing that is exchanging data with the main control computer, and GPS functionality as part of the drones.

After the user(s) have placed the radar elements in proximity to the location believed to achieve the desired radar coverage, the user(s) could activate the system. The communications between the main control computer and the GPS functionality housed with the radar elements, along the readings from the radar elements, could be used to establish the overall radar coverage and gaps in it. If the main control computer has a display, a graphical depiction of the overall radar coverage and the gaps could be made visible. If the radar elements can be positioned from a remote location (e.g., through signals from the main control computer to mechanics that can move the radar components), then the main control computer could possibly be used to move the radar elements in such a way as to provide more favorable radar coverage for the system. In addition or alternatively, the intensity of the radar elements could be changed such that radar coverage of one or more radar elements is increased (for example, if there are gaps) or decreased (if there is unnecessary overlap in coverage). As such changes are made, the coverage map on the display connected to the main control computer could be set to automatically change.

During the example initiating process described above or after such process is completed, in this example of the sequence, a step could be the activation and strategic deployment of associated (friendly) drones. In this embodiment, the associated drones are also equipped with GPS functionality. Such a component, when in communication with, for example, the main control computer, could be used in tandem with drone control technology in the main control computer to manage the position of the associated drones in and around the system's overall radar coverage. Further, the associated drone locations could be depicted in the display that shows the overall radar coverage area (which could also be changed to show specific sections of the coverage area—e.g., within a certain proximity of the associated drone or along the drone's planned path). Similarly, the system could command or request that a known target, such as a friendly associated drone or ground vehicle carrying a known target, move through the detection area of one or more radar units. Using the location information from the friendly target, the system is capable of creating a "ground truth" about the coverage range and/or area.

In a preferred embodiment of the system, the display generated by the array of radar elements depicts and shows the locations of a variety of known objects. It could show, for example, pre-established landmarks (natural or man-made) and other objects within its overall area of coverage. In this way, the system could set the 'norm'. It could, for example, depict electric power towers and wiring relative to associated drones and their flight paths.

With the 'norm' established, the system in this particular embodiment will be set to more aptly identify what could possibly be unassociated objects (such as spy drones). The radar elements would detect such unassociated objects and send data signals with the location and path of such objects to the main control computer. The main control computer could first attempt to ascertain if the objects are actually associated (friendly) drones that were not accounted for properly. If the association is confirmed, then the system could be updated to include the associated drones as desired. If the association is not confirmed, then the computer could to depict the location and possibly predict the flight path on the display, assuming it could capture and calculate such from the initial set of identification data. In addition, the system could generate an alert to initiate measures to obtain more information about the unassociated moving objects and, if needed, to intercept and/or disable them. For example, if one or more of the associated drones is equipped with a camera, then such a drone could possibly be positioned, with the GPS and radar data available to the main control computer and the main control computer's control over the associated (friendly) drone, to obtain images of the unassociated moving object. Likewise, if one or more ground-mounted assets are available, such as high-powered cameras, mobile security personnel or similar resources, such assets could be directed to move to and/or look at the location of the unassociated moving object.

Figure 11:
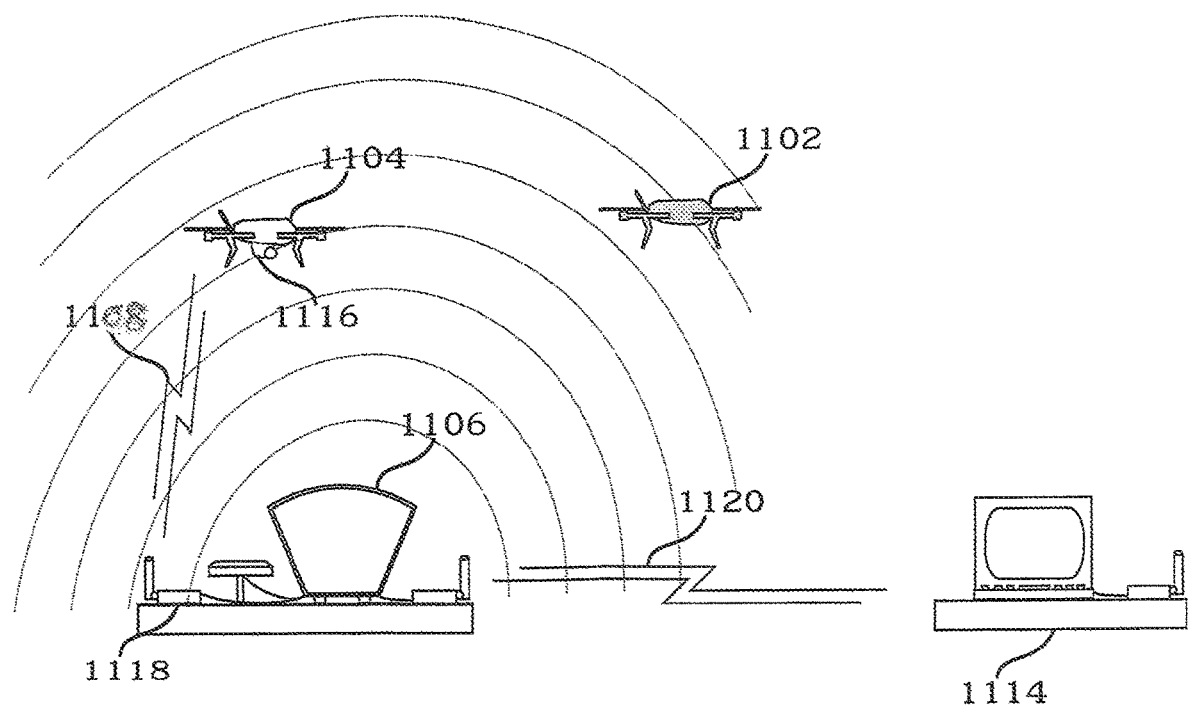
FIG. 11 shows an embodiment of the present invention with a process through which networked radar elements detect, identify, monitor and control airborne objects (e.g., unassociated moving objects are detected and monitored and associated drones are controlled)

FIG. 11 depicts a configuration of the present invention through which unassociated moving objects 1102 may be detected and monitored and associated drones 1104 can be controlled. It is an example of a version of the inventive system with a process similar to that shown in FIG. 10. With the applicable software employed with this embodiment, through an array of networked radar elements (such as the radar element 1106), the system controlled by main control computer 1114 via signals 1120, through its communications functionalities and signal 1108 from transmitter 1118, can control the travel of drones that are registered as associated with the network. In addition, with the use of applicable identification software, the inventive system can identify and make distinctions among other unassociated and associated moving objects. For example, the inventive system could distinguish a bird, from a low flying aircraft, from an unassociated drone. Certain embodiments of the present invention can also be enabled with the ability to distinguish one from a multitude of associated and unassociated drones flying in relative close proximity to one another. In a more advance version of this embodiment of the inventive system, the inventive system can initiate actions by associated drone 1104, people or other devices when unassociated moving object 1102 is detected. For example, associated drone 1104 with camera 1116 could be deployed to provide images of unassociated moving object 1102. As suggested above, in addition to the radar capabilities, radar elements 1106 preferably have communications, processing and navigation/location determination capabilities (or can be pre-programmed for a designated location). One of ordinary skill in the art would also recognize that radar elements 1106 could be powered by a vehicle to which they are attached, by batteries, solar panels or by wiring them into the local power grid.

In still another embodiment of the present invention, the system can determine the positioning of its elements in a global sense, thereby allowing the radar element or radar elements to calculate the location of associated and unassociated moving objects in a global reference system. The inventive system may also support networked operation, where detection and monitoring information is shared to foster continuous monitoring throughout the desired coverage area.

One of ordinary skill in the art would further realize that the inventive system may include a user interface that would allow the system operator(s) to, among other things (A) view depictions of the area coverage of each radar element unit and/or the aggregation of such coverage area (or gaps therein) on a map (in addition or in lieu of displaying the location/trajectory of detected objects on that same map), (B) monitor the status of a radar element or a networked array of radar elements, (C) manage and monitor individual detections of unassociated moving objects, (D) display the analysis of monitored associated and unassociated moving objects, (E) trigger actions based upon the information accessible from the radar element(s), or (F) perform a combination of the foregoing tasks. The inventive system, through an applicable display, could project the location and area of coverage of each radar element, potentially including blind spots and gaps in coverage, onto a global/local map projected onto a user display. When new radar elements are added to or removed from the array, the user interface could show the updated coverage area.

Figure 12:
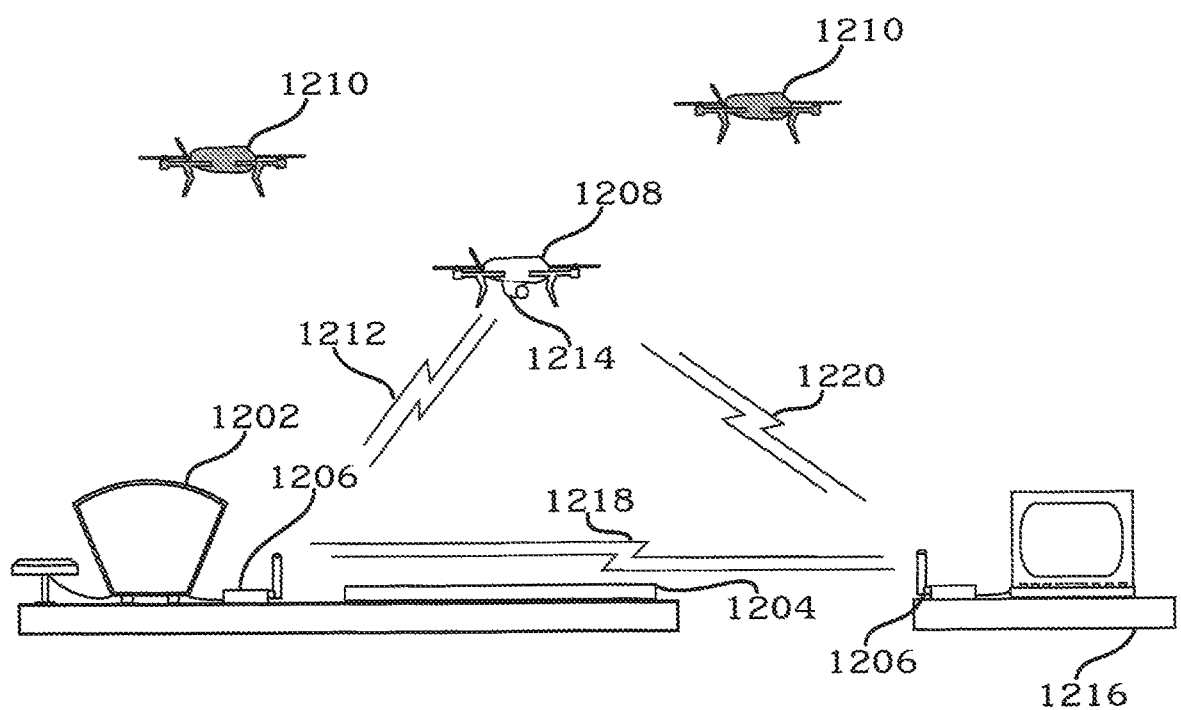
FIG. 12 shows an embodiment of the present invention in which drones are deployable from and can potentially dock on networked landing pads that include radar elements.

FIG. 12 shows an embodiment of the present invention inclusive of docking elements. In this particular embodiment, radar element 1202 is physically part of, and electronically connected to docking pad 1204. Radar element 1202 communicates with main control computer 1216 through signal 1218. Docking pad 1204 also have communication element 1206. While radar element 1204 can monitor associated drone 1208 and unassociated drones 1210, communications element 1206 can communicate with associated drone 1208 through signal 1212. Such signal 1212 can be used to, for example, (A) monitor the conditions of the associated drone 1208 (e.g., fuel levels), (B) control its flights, and (C) transmit images from camera 1214 to docking pad 1208. All of the foregoing could be monitored and managed using main control computer 1216, which can be electronically networked with docking pad 1204 from which associated drone 1208 is deployable and to which associated drone 1208 could dock. If and as necessary, main control computer 1216 can also communicate with associated drone 1208 through signal 1220. The docking pad can also perform tasks without human supervision or intervention. For example, such a docking pad could discern authorized airborne object (like associated drone 1208) from an unauthorized one (spy drone, a bird, etc.—like unassociated drones 1210) and guide the authorized airborne object to its location. The performance of such tasks could be performed remotely and/or autonomously. The docking pad might also be on a moving vehicle. In addition, the docking pad could be one of many in the array, which then guides associated drone 1208 from one docking pad to another. In another embodiment of the invention, the docking pad could act as a "ready force" garage, housing a camera and/or an intercept drone which can be dispatched to investigate an unauthorized vehicle/person/etc.

Figure 13:
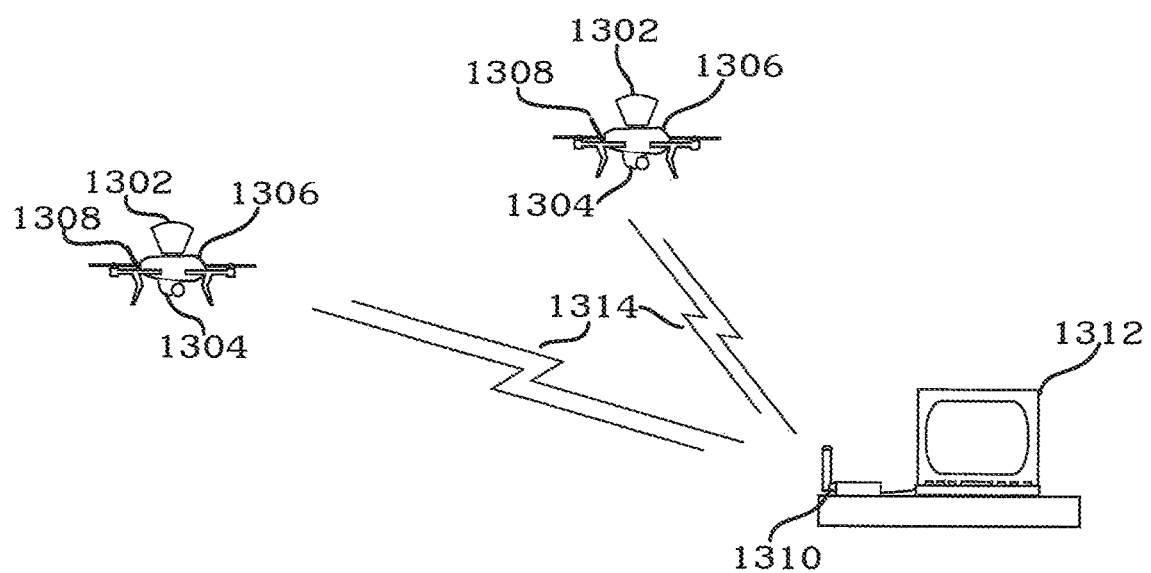
FIG. 13 shows an embodiment of the present invention in which the radar elements are attached to the underside of drones and in which the drones and the radar elements are in electronic communication with a main control computer.

FIG. 13 shows an embodiment of the present invention with radar elements 1302 and cameras 1304 attached to associated drones 1306. Radar elements 1302 is electronically connected with communication elements 1308. Communication elements 1310 are electronically and physically connected with the main control computer 1312. Communication elements 1308 and 1310 communicate through signal 1314. This configuration supports a variable deployment ad positional of radar elements 1302 due to the mobility of associated drones 1306. Manually or automatically, drones 1306 can be positioned as need to effectuate the desired coverage area of radar elements 1302. One of ordinary skill of the art would realize that not all drones would need to have radar elements 1302 attached. Further, not all drones would need to have cameras. Accordingly, the configuration of the elements of this embodiment of the present invention are variable.

Additional Thoughts

The foregoing descriptions of the present invention have been provided for the purposes of illustration and description. It is not intended to be exhaustive or to limit the invention to the precise forms disclosed. Many modifications and variations will be apparent to the practitioner of ordinary skilled in the art. Particularly, it would be evident that while the examples described herein illustrate how the inventive apparatus may look and how the inventive process may be performed. Further, other elements/steps may be used for and provide benefits to the present invention. The depictions of the present invention as shown in the exhibits are provided for purposes of illustration.

Although these teachings have been described with respect to various embodiments, it should be realized these teachings is also capable of a wide variety of further and other embodiments within the spirit and scope of these teachings.

The embodiments were chosen and described in order to best explain the principles of the invention and its practical application, thereby enabling others of ordinary skill in the art to understand the invention for various embodiments and with various modifications that are suited to the particular use contemplated.

What is claimed is:

1. A method of monitoring at least one moving object comprising the steps of:

activating at least two radar elements, inclusive of signal processing modules for detection, tracking, classification and information distribution, that detects such a moving object when such moving object is within the coverage areas of such radar elements, wherein the reach of such coverage areas are determined by a radar range equation and a bistatic radar equation of each radar element deployed, by emitted power levels of each radar element and a type of such moving object to be detected, wherein the information received through the detection of at least one radar element can be used to create an anticipated path of such a moving object as it moves, and wherein at least one of such radar elements is mounted on a vehicle;

initiating communications between a main control computer and such radar elements to commence the exchange of desired information between such main control computer and such radar elements;

establishing overall radar coverage and gaps;

initiating and maintaining communications between such main control computer and such vehicle upon which at least one of the radar elements is mounted wherein such vehicle is activated and strategically deployed to increase such overall radar coverage and to minimize such gaps;

changing the configuration of such radar elements via at least one signal sent to each such radar elements from the main control computer so that the overall radar coverage areas are desirable; and controlling movement of such vehicle relative to and within the desired overall radar coverage as desired through the use of the such main control computer, wherein such a moving object, when detected, can be monitored with at least one signal regarding such moving object sent by such radar elements to such main control computer.

2. The process of claim 1 further comprising the step of depicting such vehicle, such radar elements, and the overall radar coverage area on a display with images generated by such main control computer.

3. The process of claim 2 wherein the overall radar coverage area is a graphical depiction and the gaps are visible.

4. The process of claim 1 wherein such change in the configuration of any such radar element is in such radar element's positioning.

5. The process of claim 1 wherein such change in the configuration of any such radar element is in such radar element'power, with an impact on such radar element's range of coverage.

6. The process of claim 1 wherein such main control computer generates an alert to initiate measures to obtain more information about such moving object and to initiate the interception of such moving object.

7. The process of claim 1 wherein such a moving object, when detected, can be monitored with at least two signals regarding such moving object sent by each of at least two such radar elements to such main control computer.

8. The process of claim 1 wherein such vehicle is unmanned.

9. The process of claim 8 wherein such unmanned vehicle is an airborne vehicle.

10. The process of claim 8 wherein such unmanned vehicle is a land-based vehicle.

11. The process of claim 8 wherein such unmanned vehicle is a water-based vehicle.

\* \* \* \* \*